(12) United States Patent
Lai (10) Patent No.: US 8,262,097 B2
(45) Date of Patent: Sep. 11, 2012

(54) QUICK-RELEASE MECHANISM FOR HAND TOOL

(76) Inventor: Jin-Tsai Lai, Taichung (TW)

( * ) Notice: Subject to any disclaimer, the term of this patent is extended or adjusted under 35 U.S.C. 154(b) by 735 days.

(21) Appl. No.: 12/498,368

(22) Filed: Jul. 7, 2009

(65) Prior Publication Data

US 2011/0006489 A1    Jan. 13, 2011

(51) Int. Cl.
*B23B 31/107* (2006.01)
(52) U.S. Cl. ......... 279/74; 279/82; 279/904; 279/155
(58) Field of Classification Search ............ 279/79, 279/80, 76, 75, 74, 82, 904, 905, 202, 22, 279/30, 155
See application file for complete search history.

(56) References Cited

U.S. PATENT DOCUMENTS

| | | | | |
|---|---|---|---|---|
| 5,586,847 A * | 12/1996 | Mattern et al. | ............ | 408/239 A |
| 6,695,321 B2 * | 2/2004 | Bedi et al. | ................. | 279/22 |
| 6,973,858 B2 * | 12/2005 | Huang | ................. | 81/177.85 |
| 7,114,728 B2 * | 10/2006 | Chen | ................. | 279/24 |
| 7,581,470 B1 * | 9/2009 | Huang | ............ | 81/438 |
| 2004/0262856 A1 * | 12/2004 | Cantlon | ............ | 279/22 |
| 2006/0022416 A1 * | 2/2006 | Chen | ................. | 279/74 |
| 2010/0219594 A1 * | 9/2010 | Nash | ................. | 279/77 |

FOREIGN PATENT DOCUMENTS

EP           360947 A1 *   4/1990

* cited by examiner

*Primary Examiner* — Daniel Howell
*Assistant Examiner* — Paul M Janeski (57) ABSTRACT

A quick-release mechanism for a hand tool includes a center rod, a first sleeve, a second sleeve, and an engaging member. The first sleeve is sleeved on the center rod. The second sleeve is sleeved on the center rod and the first sleeve for moving with the first sleeve. The second sleeve has a recess, a first pushing portion, and a second pushing portion. The engaging member has a protruding portion and an engaging end. The first pushing portion or the second pushing portion abuts against the protruding portion to push the engaging end such that the engaging end engages with a tool bit. When pulling or pushing the first sleeve, the second sleeve moves such that the protruding portion is received in the recess. Simultaneously the engaging end disengages with tool bit.

8 Claims, 10 Drawing Sheets

FIG. 10

QUICK-RELEASE MECHANISM FOR HAND TOOL

BACKGROUND OF THE INVENTION

1. Field of the Invention

The present invention relates to a hand tool, and more particularly to a quick-release mechanism for a hand tool.

2. Description of Related Art

A conventional quick-release mechanism for screwdriver bits in accordance with the prior art comprises a chuck assembly and a tool bit held in the chuck by detent means cooperating with a circumferential groove on the shank of the bit. The detent means are released by pulling a sleeve axially back from the tool bit, whereby the tool bit may be pulled out of the chuck. The conventional quick-release mechanism requires the user to hold the tool, manipulate the sleeve and, simultaneously, either press the tool bit into the mechanism to install it or pull the tool bit out of the chuck. This is not possible for user to operate by one hand. If user can pull the sleeve toward the tool bit, the tool bit can be pulled out the chuck simultaneously.

The present invention has arisen to mitigate and/or obviate the disadvantages of the conventional quick-release mechanism.

SUMMARY OF THE INVENTION

The main objective of the present invention is to provide an improved quick-release mechanism for a hand tool, in that a quick-release mechanism having two configurations is acquired.

To achieve the objective, the quick-release mechanism for a hand tool includes a center rod for adapting to connect to a tool bit, two stop rings respectively sleeved on two ends of the center rod, a first sleeve sleeved on the center rod, two springs sleeved on the center rod, a second sleeve sleeved on the center rod and the first sleeve, and an engaging member disposed in an outer peripheral of the center rod. The two stop rings firmly connects to the center rod. The first sleeve has a protruding rib formed in an inner peripheral thereof. The protruding rib is movably disposed between the two stop rings. Each spring has one end abutted against one of the two stop rings and the other end abutted against the protruding rib. When pulling the first sleeve, the protruding rib biases one of the two springs. When pushing the first sleeve, the protruding rib biases the other one spring to provide a restore force. The second sleeve moves with the first sleeve. The second sleeve has a recess, a first pushing portion and a second pushing portion respectively formed in an inner peripheral thereof. The recess is disposed between the first pushing portion and the second pushing portion. The engaging member has a protruding portion formed therein and an engaging end disposed in one end thereof. When the protruding portion is pushed, the engaging end protrudes into an inner peripheral of the center rod to selectively engage with the tool bit. When the first pushing portion abuts against the protruding portion, user pulls the first sleeve to move the second sleeve toward the first sleeve such that the protruding portion is received in the recess to disengage the engaging end with the tool bit. When the second pushing portion abuts against the protruding portion, user pushes the first sleeve to move the second sleeve away from the first sleeve such that the protruding portion is received in the recess to disengage the engaging end with the tool bit.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-6, a quick-release mechanism for a hand tool in accordance with the present invention comprises a center rod 1, a first sleeve 2 movably sleeved on the center rod 1, a second sleeve 3 movably sleeved on the first sleeve 2 and the center rod 1, and an engaging member 4 disposed in an outer peripheral of the center rod 1.

Figure 1:
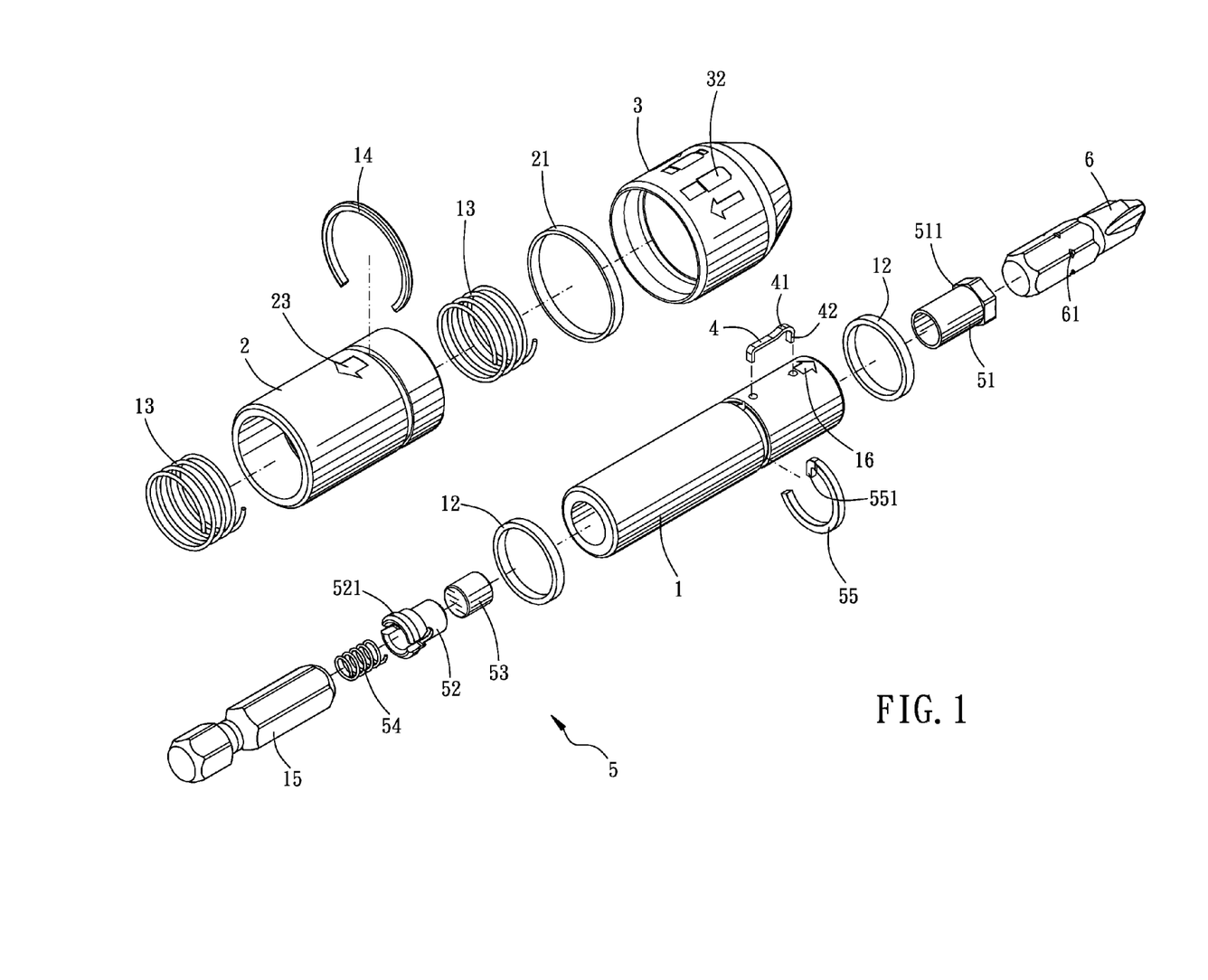
FIG. 1 is an exploded perspective view of a quick-release mechanism for a hand tool in accordance with the present invention.
Figure 2:
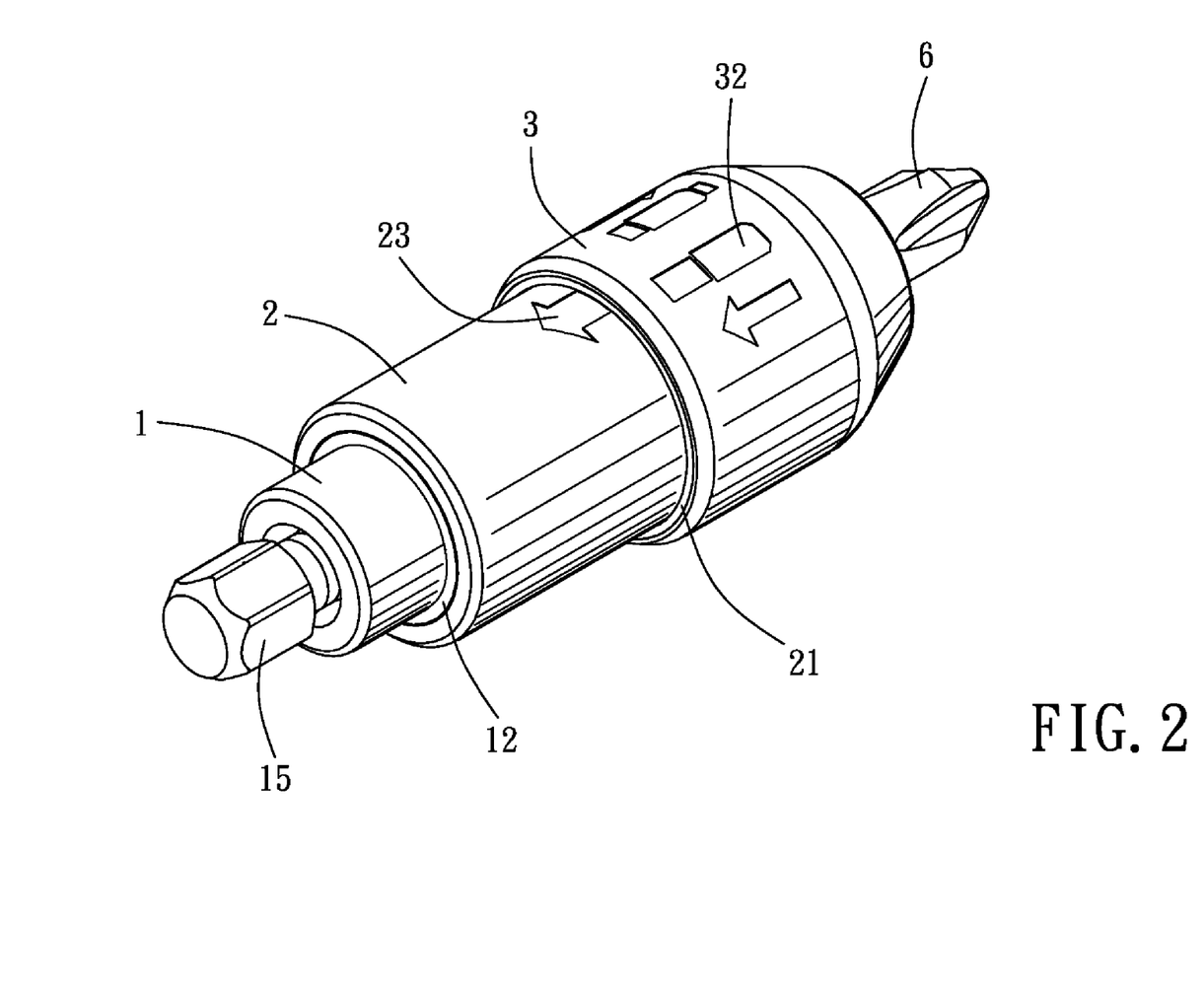
FIG. 2 is an assembled perspective view of the quick-release mechanism for a hand tool in accordance with the present invention.
Figure 3:
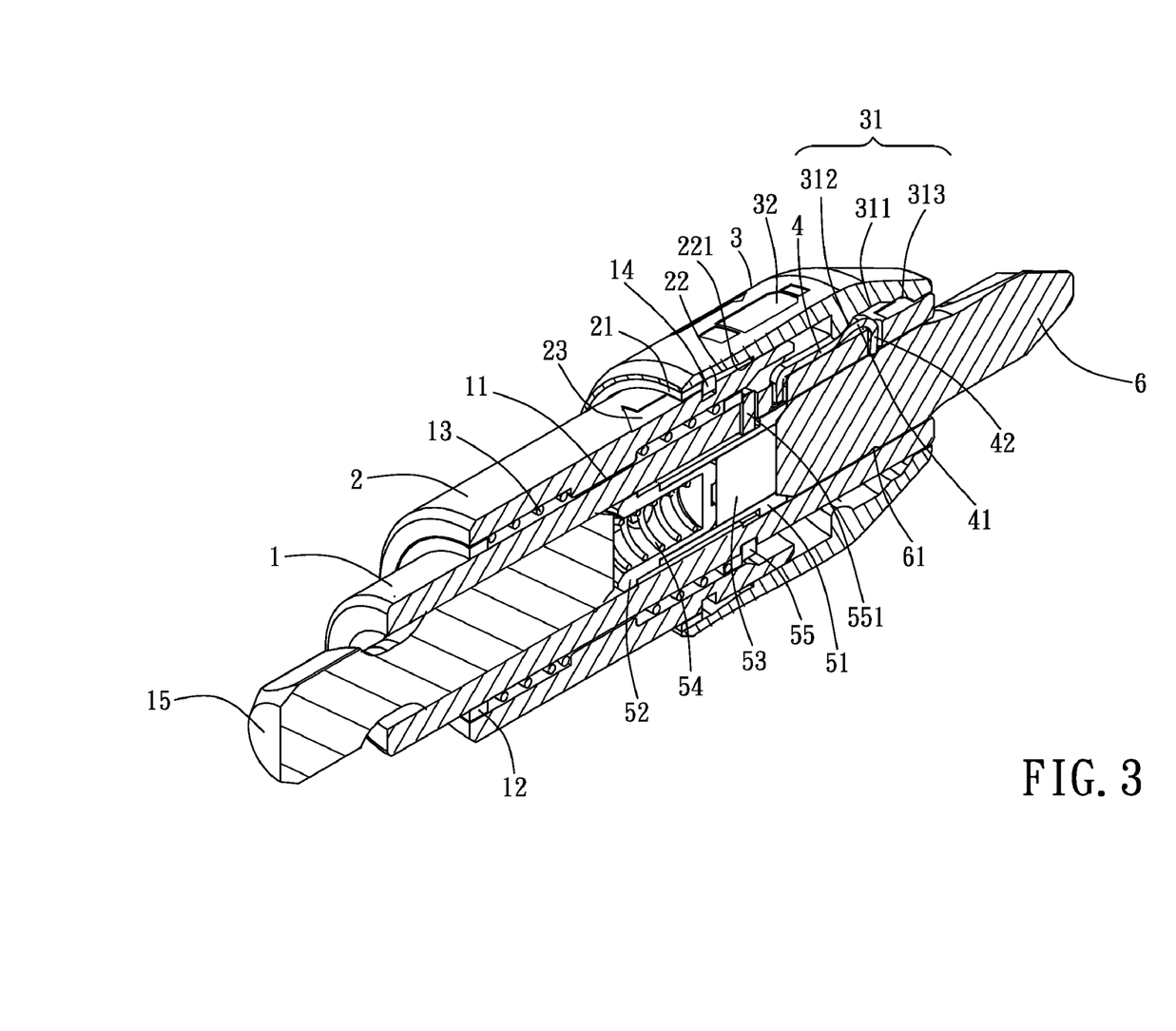
FIG. 3 is a cross-sectional perspective view of the quick-release mechanism for a hand tool in FIG. 2.

The center rod 1 is provided for inserting a tool bit 6. The center rod 1 is made of a long tube structure. Both the first sleeve 2 and the second sleeve 3 are in a shape of circular tube. An outer diameter of the second sleeve 3 is greater than that of the first sleeve 2. The first sleeve 2 is sleeved on a middle of the center rod 1. The second sleeve 3 is sleeved on one end of the center rod 1 and one end of the first sleeve 2 such that one end of the second sleeve 3 is sleeved on the first sleeve 2 and the other end of the second sleeve 3 is sleeved on the center rod 1.

The first sleeve 2 has an annular protruding rib 11 extended from an inner peripheral thereof. The quick-release mechanism for a hand tool in accordance with the present invention further comprises two stop rings 12 firmly sleeved on the center rod 1 and two springs 13 sleeved on the center rod 1. The protruding rib 11 is disposed between the two stop rings 12. Each spring 13 has one end abutted against the protruding rib 11 and the other end abutted against one of the two stop rings 12.

Figure 6:
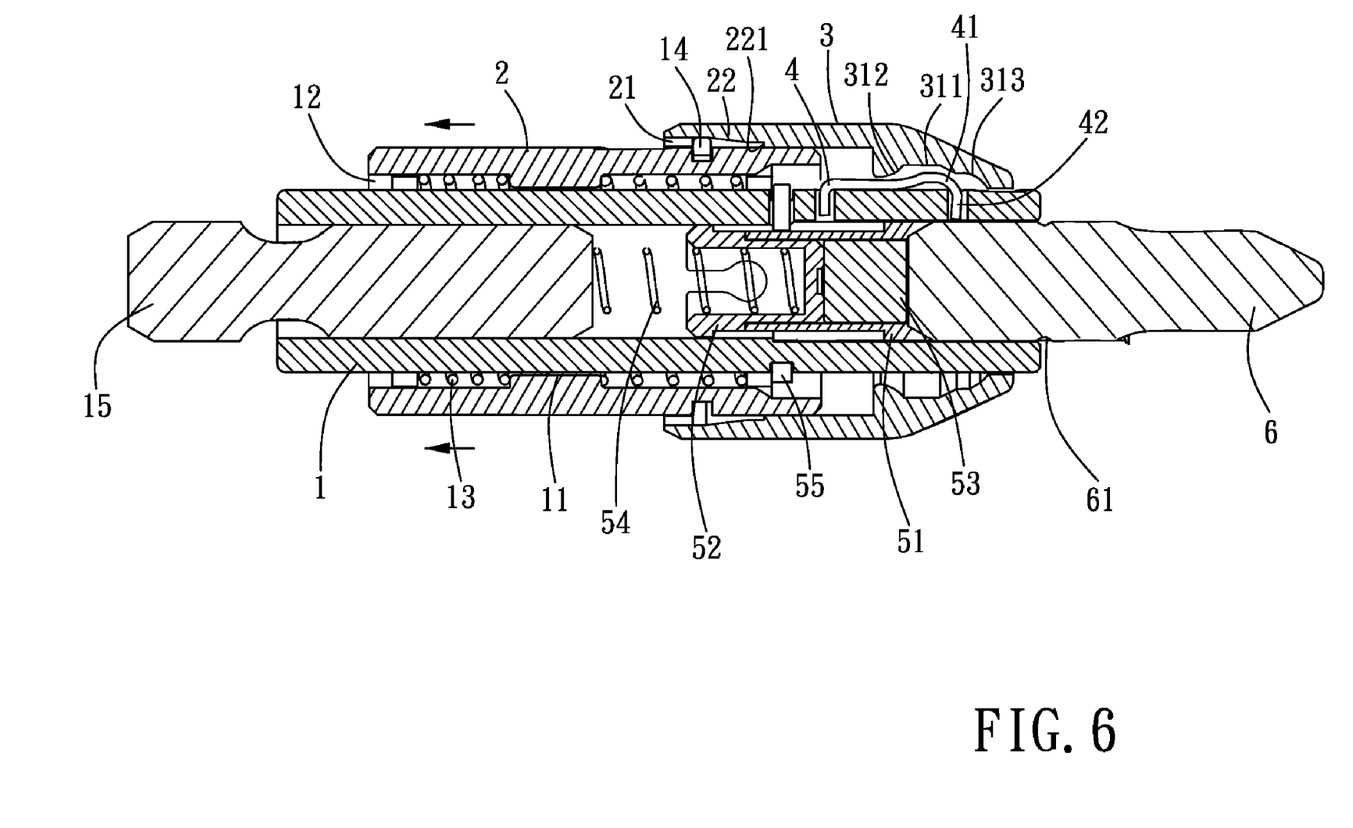
Figure 7:
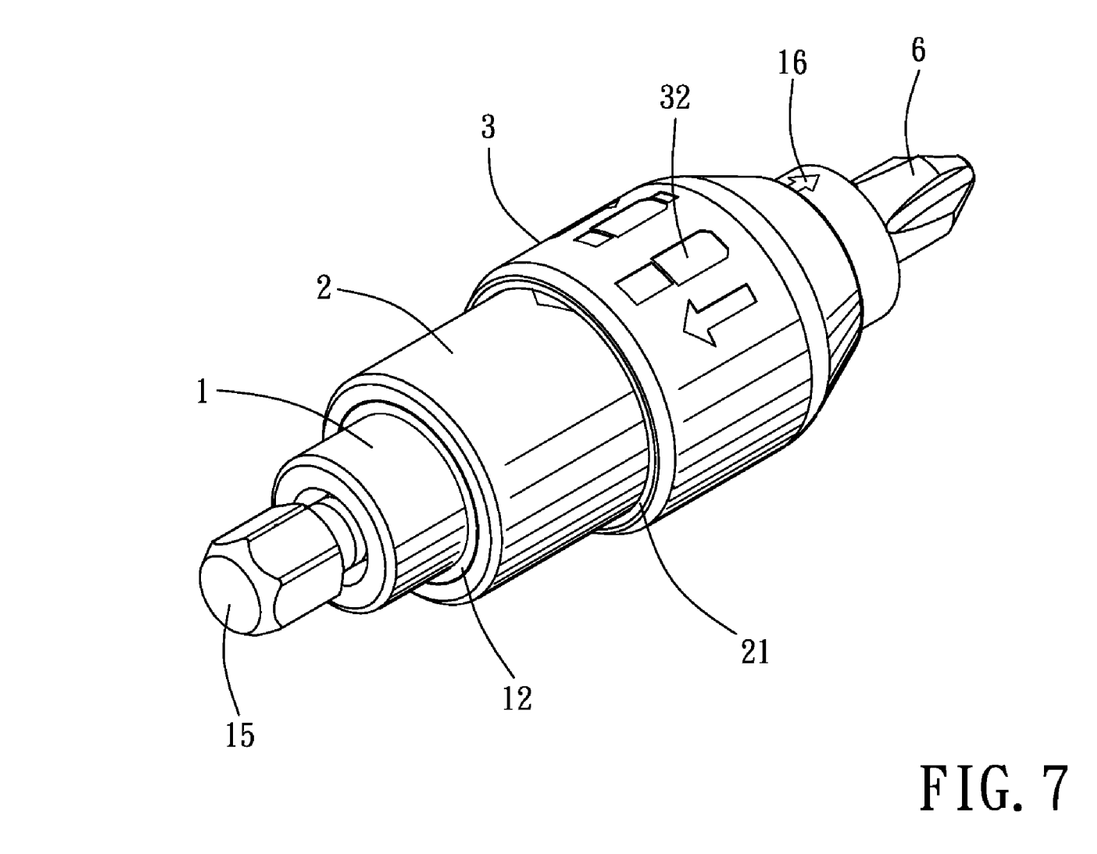
FIG. 7 is an assembled perspective view of the quick-release mechanism for a hand tool in a second configuration.
Figure 10:
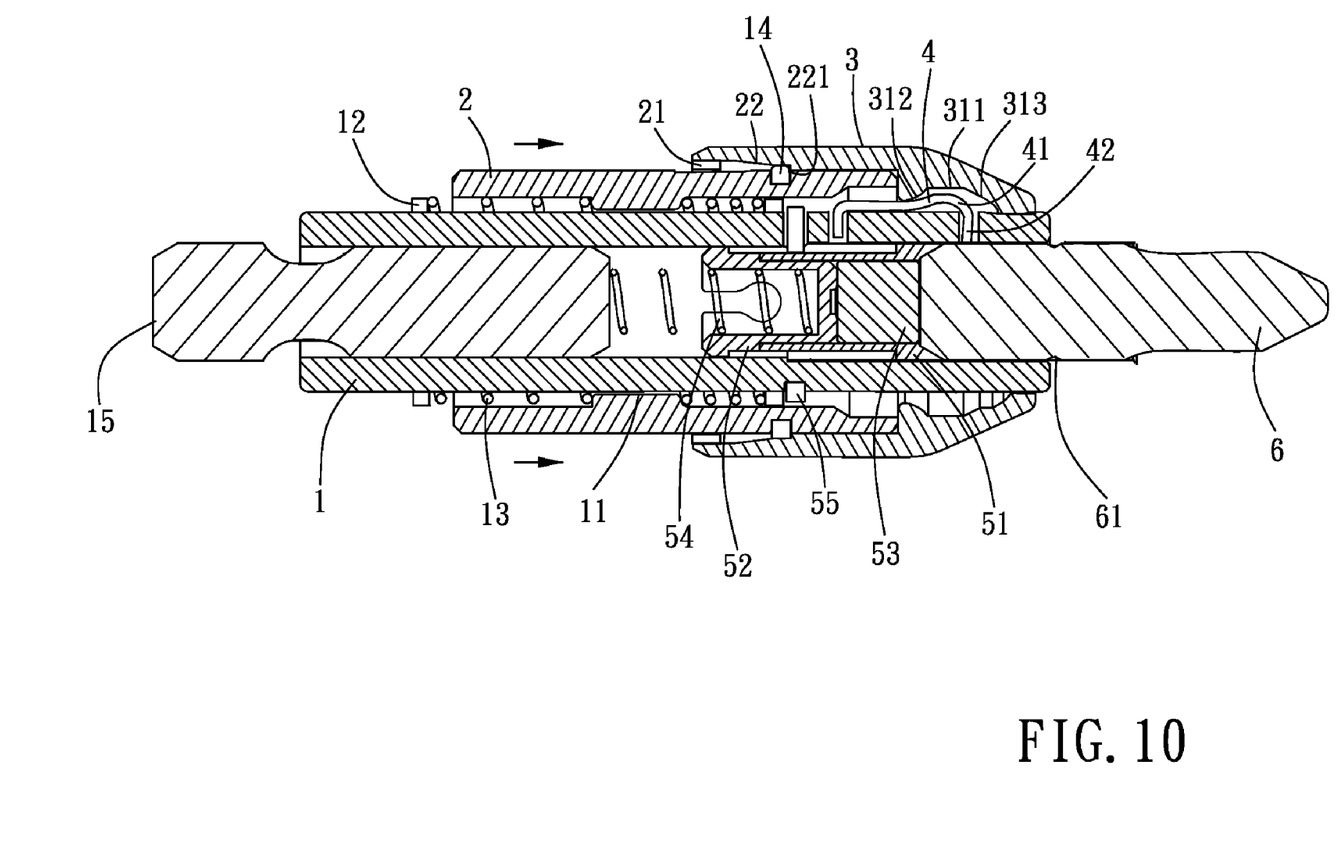

The quick-release mechanism for a hand tool in accordance with the present invention further comprises a clip ring 14 and a thrust ring 21. The clip ring 14 is firmly sleeved on the first sleeve 2. The thrust ring 21 is firmly pressed in an inner peripheral of the second sleeve 3 and disposed in one end of the second sleeve 3. The second sleeve 3 has a taper portion 22 formed in the inner peripheral thereof and disposed in the end same as the thrust ring 21. The taper portion 22 is tapered away from the thrust ring 21. The second sleeve 3 has a shoulder 221 formed in one end of the taper portion 22 opposite to the thrust ring 21. The clip ring 14 is disposed between the thrust ring 21 and the shoulder 221. The clip ring 14 selectively abuts against the thrust ring 21 and the shoulder 221. Referring to FIG. 6, the operation of the first sleeve 2 in a first configuration is illustrated. When the first sleeve 2 is pulled to move away from the second sleeve 3, the protruding rib 11 moves left relative to the FIG. 6 to bias the spring 13 in the left. Simultaneously the clip ring 14 moves left to abut against the thrust ring 21 such that the thrust ring 21 and the second sleeve 3 move left with the first sleeve 2. When releasing the first sleeve 2, the spring 13 in the left restores to push the protrusion rib 11 and the first sleeve 2 to move back to the initial state. Simultaneously the clip ring 14 moves with the first sleeve 2 to abut against the taper portion 22 such that the second sleeve 3 moves with the first sleeve 2. Referring to FIG. 10, the operation of the first sleeve 2 in a second configuration is illustrated. When the first sleeve 2 is pushed to move toward the second sleeve 3, the protruding rib 11 moves right relative to the FIG. 10 to bias the spring 13 in the right. Simultaneously the clip ring 14 moves right to abut against the shoulder 221 such that the second sleeve 3 moves right with the first sleeve 2. When releasing the first sleeve 2, the spring 13 in the right restores to push the protrusion rib 11 and the first sleeve 2 to move back to the initial state.

The engaging member 4 is substantially an inversed U-shaped structure. The engaging member 4 has a protruding portion 41 formed therein. The engaging member 4 has one end firmly engaged to the center rod 1 and an engaging end 42 adjacent to the protruding portion 41. The engaging end 42 selectively protrudes into an inner peripheral of the center rod 1. When the protruding portion 41 is pushed, the engaging end 42 protrudes into the inner peripheral of the center rod 1 to engage the tool bit 6.

Figure 4:
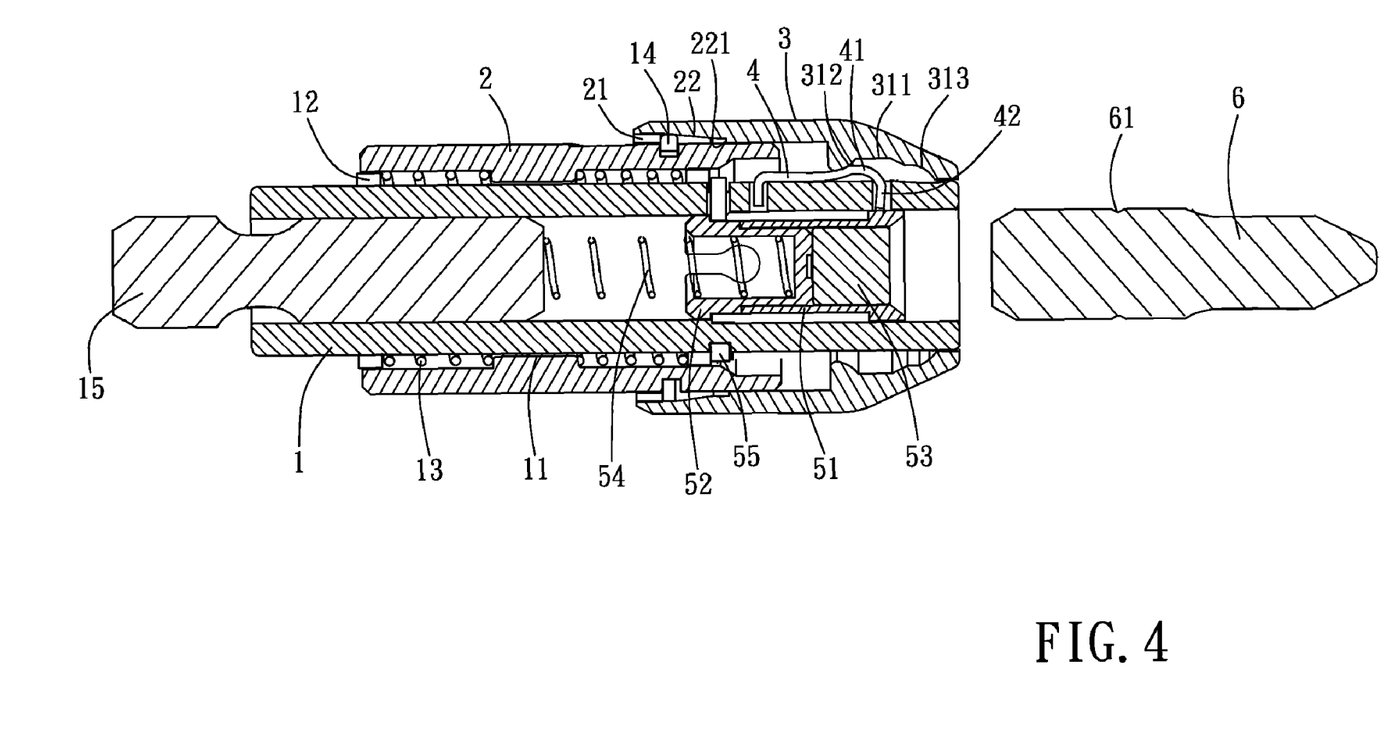
FIGS. 4-6 show the operations of the quick-release mechanism in a first configuration.
Figure 5:
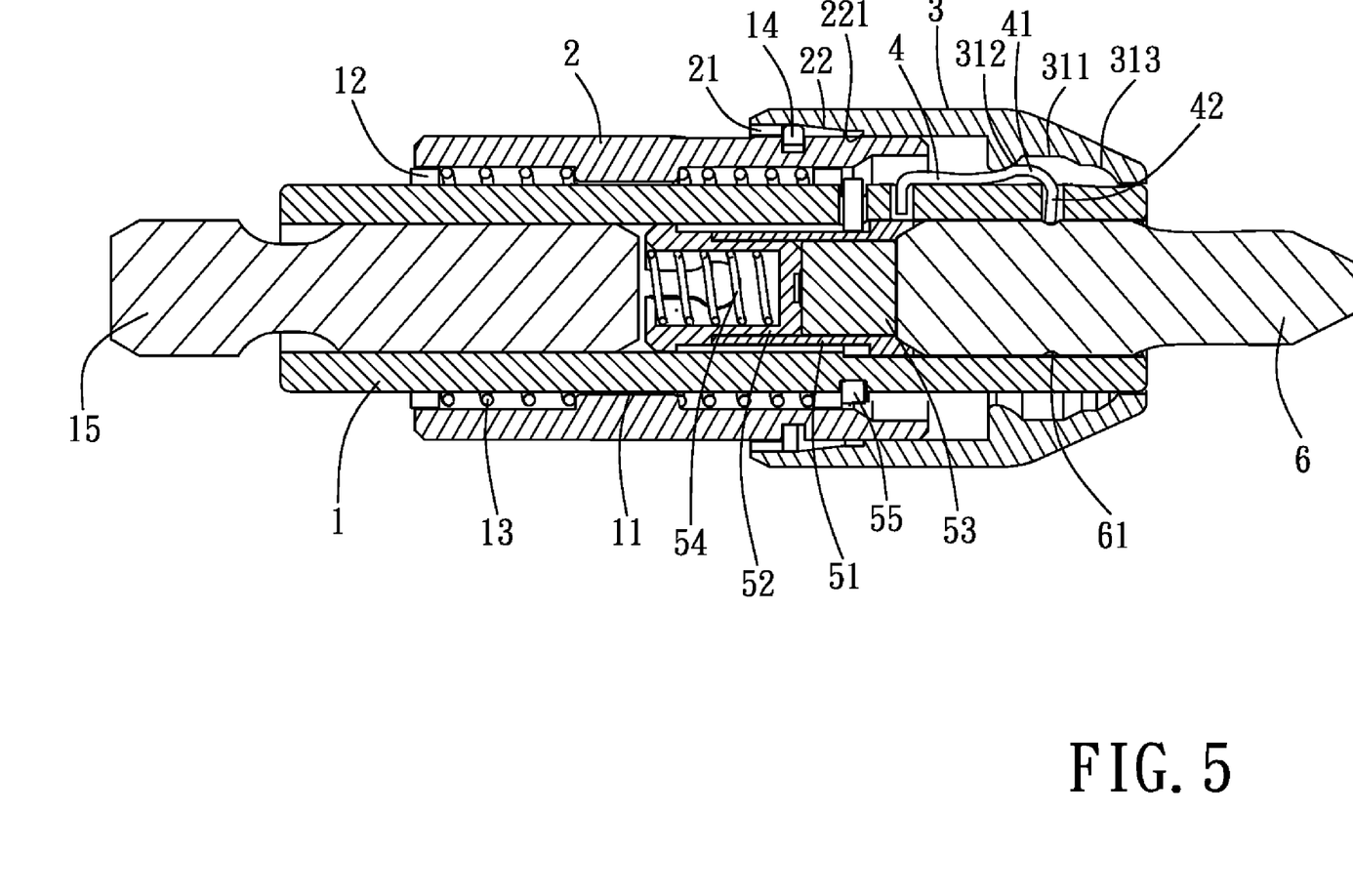

The quick-release mechanism for a hand tool in accordance with the present invention further comprises a connecting rod 15 disposed in one end of the center rod 1 and plugged into the inner peripheral of the center rod 1. The connecting rod 15 is provided to adapt to connect to the hand tool. The quick-release mechanism for a hand tool in accordance with the present invention further comprises a sliding assembly 5 received in the inner peripheral of the center rod 1. The sliding assembly 5 is provided to elastically eject the tool bit 6. The sliding assembly 5 includes a first receiving seat 51, a second receiving seat 52 partially received in the first receiving seat 51, a magnet 53 received in the first receiving seat 51, and a spring 54 receiving in the second receiving seat 52. The magnet 53 is provided to attract the tool bit 6. The spring 54 has one end abutted against the second receiving seat 52 and the other end abutted against the connecting rod 15. The first receiving seat 51 has a flange 511 formed in one end thereof opposite to the second receiving seat 52. The second receiving seat 52 has a flange 521 formed in one end thereof opposite to the first receiving seat 51. The quick-release mechanism for a hand tool in accordance with the present invention further comprises a clip member 55 firmly sleeved in the outer peripheral of the center rod 1. The clip member 55 has a positioning end 551 protruding into the inner peripheral of the center rod 1. The positioning end 551 is disposed between the flange 511 and the flange 521. The positioning end 511 selectively abuts against the flange 511 or the flange 521 to prevent the sliding assembly 5 from falling out. Referring to FIGS. 4 and 5, the operation of the positioning end 551 is illustrated. In the initial state the flange 521 abuts against the positioning end 511 to stop the sliding assembly 5. When the tool bit 6 is inserted into the center rod 1, the tool bit 6 pushes the first receiving seat 51 and the second receiving seat 52 to move toward the connecting rod 15 such that the spring 54 is compressed. The magnet 53 attracts the tool bit 6 to retain the tool bit 6. When the tool bit 6 is pulled out, the spring 54 restores to push the first receiving seat 51 and the second receiving seat 52. Because the positioning end 551 is disposed between the flange 511 and the flange 521, the first receiving seat 51 and the second receiving seat 52 will not fall out.

Figure 9:
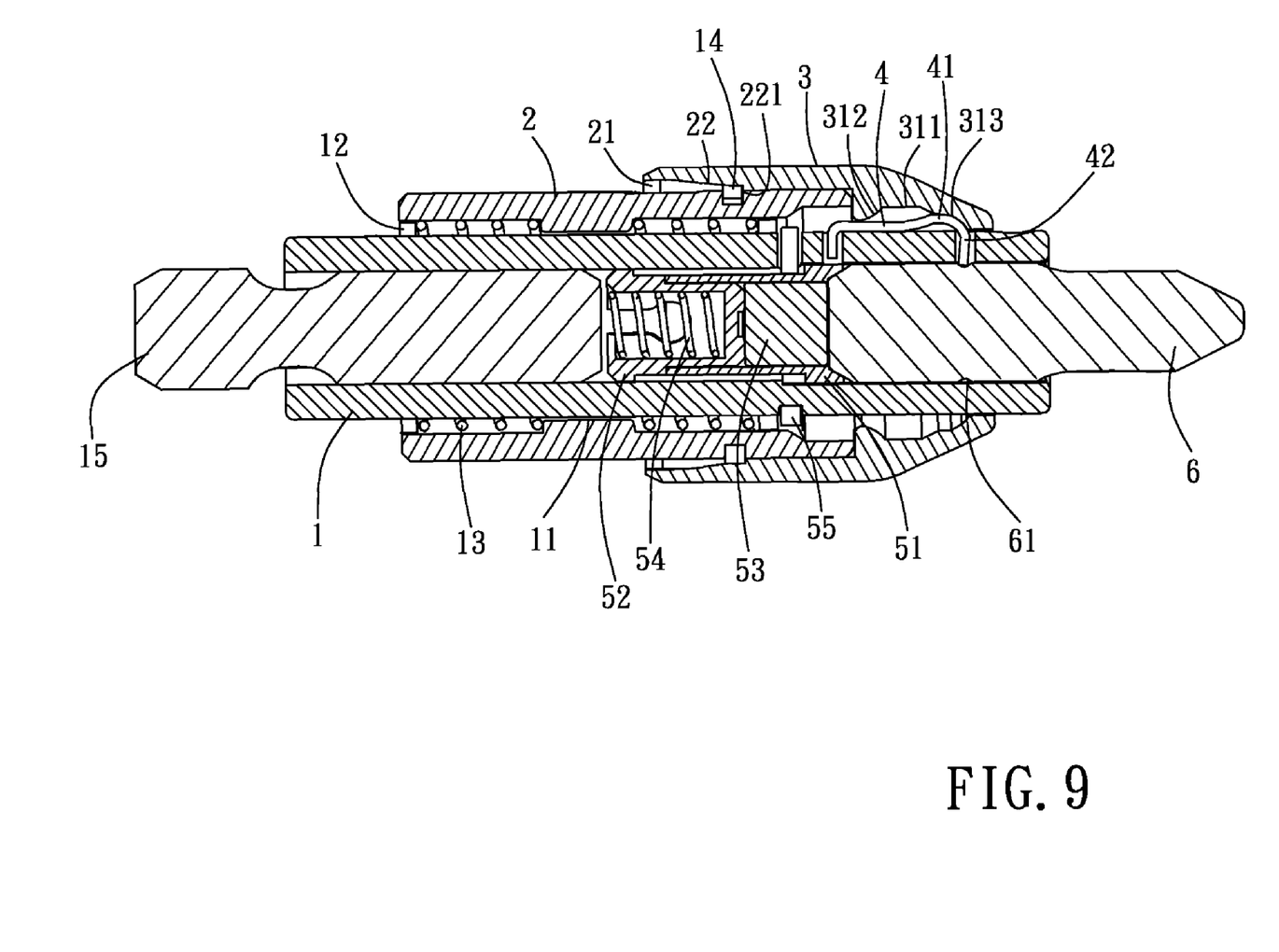

The second sleeve 3 has a pushing end 31 defined in one end thereof opposite to the first sleeve 2. The pushing end 31 has a recess 311 defined in an inner peripheral thereof, a first pushing portion 312 formed in the inner peripheral thereof, and a second pushing portion 313 formed in the inner peripheral thereof. The recess 311 is disposed between the first pushing portion 312 and the second pushing portion 313. The recess 311 is concave. A depth of the recess 311 is deeper than that of the first pushing portion 312 and that of the second pushing portion 313. Bases on the installing position between the second sleeve 3 and the center rod 1, the first pushing portion 312 or the second pushing portion 313 abuts against the protruding portion 41. Based on the first pushing portion 312 or the second pushing portion 313 abuts against the protruding portion 41, the first sleeve 2 moves away the second sleeve 3 or toward the second sleeve 3 such that the protruding portion 41 is received in the recess 311. Referring to FIGS. 5 and 6, the operation of the protruding portion 41 in the first configuration is illustrated. The protruding portion 41 abuts the first pushing portion 312 in the first configuration. When pulling the first sleeve 2 away from the second sleeve 3, the second sleeve 3 moves toward the first sleeve 2 such that the protruding portion 41 is received in the recess 311. The engaging end 42 retracts to disengage with the tool bit 6. The tool bit 6 is pushed out by the sliding assembly 5. Referring to FIGS. 9 and 10, the operation of the protruding portion 41 in the second configuration is illustrated. The protruding portion 41 abuts the second pushing portion 313 in the second configuration. When pushing the first sleeve 2 toward the second sleeve 3, the second sleeve 3 moves with the first sleeve 2 such that the protruding portion 41 is received in the recess 311. The engaging end 42 retracts to disengage with the tool bit 6. The tool bit 6 is pushed out by the sliding assembly 5.

The center rod 1, the first sleeve 2, and the second sleeve 3 respectively have indexes 16, 23, and 32 to show the operation direction of the first sleeve 2. The index 16 is disposed in one end of the center rod 1 opposite to the first sleeve 2. The index 16 is an arrow mark pointed outward. The index 23 is disposed in the middle of the first sleeve 2 and adjacent to the clip ring 14. The index 23 is an arrow mark pointed away the second sleeve 3. The index 32 is disposed in the second sleeve 3. The index 32 has two graphs and two arrow marks. One graph shows that the second sleeve 3 is sleeved on one end of the first sleeve 2. One arrow mark pointed toward the first sleeve 2 is adjacent to the graph. The other graph shows that the second sleeve 3 is sleeved on the middle of the first sleeve 2. The other arrow mark pointed away the first sleeve 2 is adjacent to the other graph. User can recognize the indexes 16, 23, and 32 and operate the quick-release mechanism which has two configurations according to the indexes 16, 23, and 32.

Referring to FIGS. 2-6, the first configuration of the quick release mechanism in accordance with the present invention is illustrated. The second sleeve 3 is sleeved on one end of the first sleeve 2 and disposed in a first position that the first pushing portion 312 abuts against the protruding portion 41. The clip ring 14 abuts against the thrust ring 21. The protruding portion 41 is pushed by the first pushing portion 312 such that the engaging end 42 protrudes into the inner peripheral of the center rod 1. The tool bit 6 has multiple notches 61 defined in an outer peripheral thereof. When the tool bit 6 is inserted into the center rod 1, the engaging end 42 engages one of the multiple notches 61 such that the tool bit 1 is firmly connected to the center rod 1 as shown in FIG. 5. Simultaneously the tool bit 6 pushes the first receiving seat 51 and the second receiving seat 52 to compress the spring 54. The magnet 53 attracts the tool bit 6 to hold the tool bit 6. When releasing the tool bit 6, user pulls the first sleeve 2 away from the second sleeve 3. The clip ring 14 abuts against the thrust ring 21 such that the second sleeve 3 moves with the first sleeve 2. The first pushing portion 312 of the second sleeve 3 moves such that the protruding portion 41 is received in the recess 311. Simultaneously the engaging end 42 retracts to disengage with the notch 61. Therefore, the tool bit 6 is pushed by the sliding assembly 5 and free to detach from the center rod 1. When releasing the first sleeve 2, the spring 13 pushes the protruding rib 11 such that the first sleeve 2 and the second sleeve 3 restore to the initial state as shown in FIG. 4.

Furthermore, the index 23 in the first sleeve 2 of the first configuration is revealed such that user can easily recognize the operation direction. By pulling the first sleeve 2 away from the second sleeve 3, the too bit 6 is released.

Figure 8:
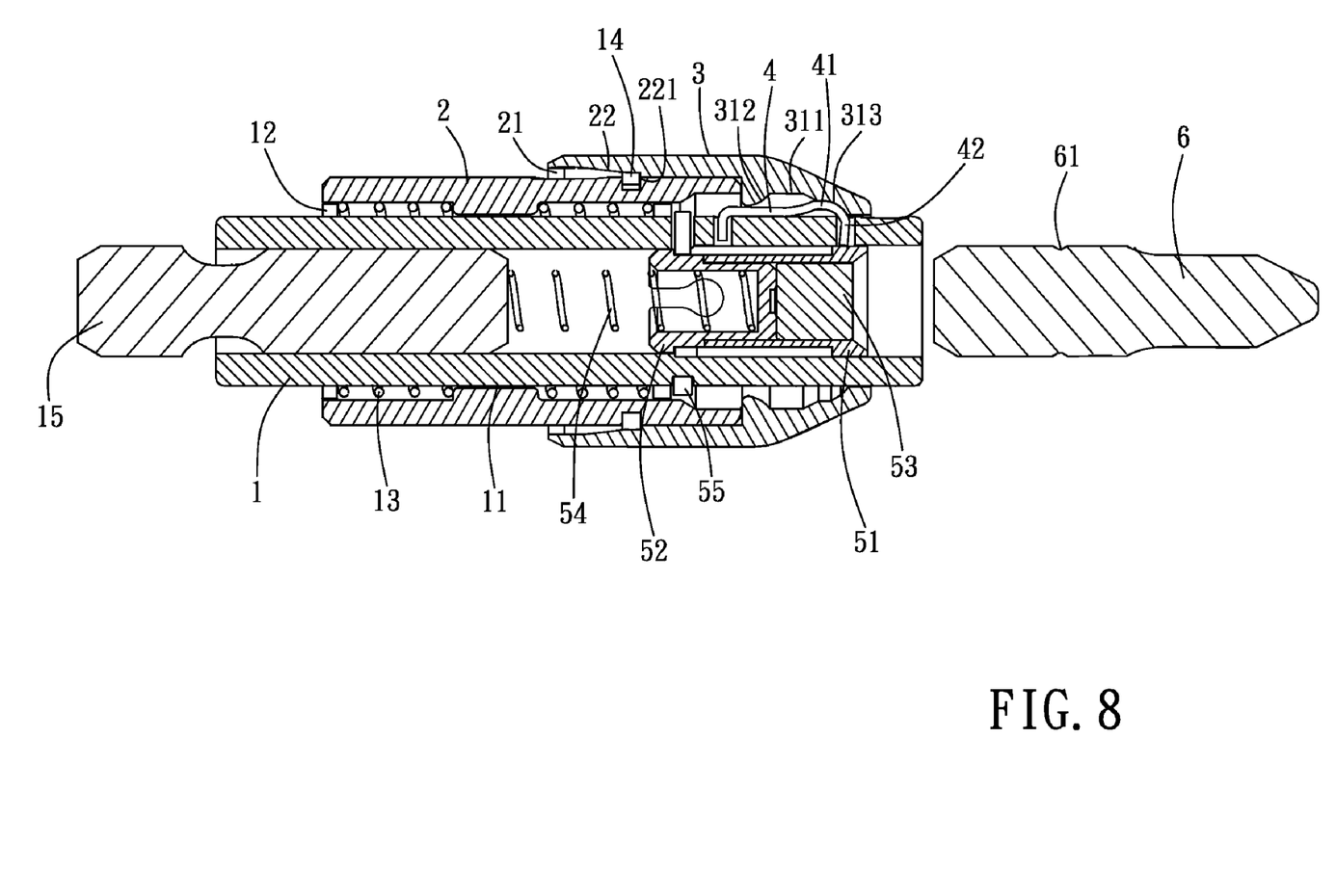
FIGS. 8-10 show the operations of the quick-release mechanism in the second configuration.

Referring to FIGS. 7-10, the second configuration of the quick release mechanism in accordance with the present invention is illustrated. The second sleeve 3 is sleeved on one end of the first sleeve 2 and disposed in a second position such that the second pushing portion 313 abuts against the protruding portion 41. The clip ring 14 abuts against the shoulder 221. The engaging member 41 is pushed by the second pushing portion 313 such that the engaging end 42 protrudes into the inner peripheral of the center rod 1. When the tool bit 6 is inserted into the center rod 1, the engaging end 42 engages one of the multiple notches 61 such that the tool bit 1 is firmly connected to the center rod 1 as shown in FIG. 9. When releasing the tool bit 6, user pushes the first sleeve 2 toward the second sleeve 3. The clip ring 14 abuts against the shoulder 221 such that the second sleeve 3 moves with the first sleeve 2. The second pushing portion 313 of the second sleeve 3 moves such that the protruding portion 41 is received in the recess 311. Simultaneously the engaging end 42 retracts to disengage with the notch 61. Therefore, the tool bit 6 is pushed by the sliding assembly 5 and free to detach from the center rod 1. When releasing the first sleeve 2, the spring 13 pushes the protruding rib 11 such that the first sleeve 2 and the second sleeve 3 restore to the initial state as shown in FIG. 8.

Furthermore, the index 16 in the center rod 1 of the second configuration is revealed such that user can easily recognize the operation direction. By pushing the first sleeve 2 toward the second sleeve 3, the too bit 6 is released.

The quick-release mechanism for a hand tool in accordance with the present invention has the following advantages. First, the second sleeve 3 is disposed in the first or second position. User can push or pull the first sleeve 3 to release the tool bit 6. Two different ways to operate the quick-release mechanism can increase the flexibility in operation. Second, all the elements of the two configurations of the quick-release mechanism are the same. The manufacturing cost is low and the assembly process is simple.

Although the invention has been explained in relation to its preferred embodiment, it is to be understood that many other possible modifications and variations can be made without departing from the spirit and scope of the invention as hereinafter claimed.

What is claimed is:

1. A quick-release mechanism for a hand tool comprising:
a center rod for adapting to connect to a tool bit;
two stop rings respectively sleeved on two ends of the center rod, the two stop rings firmly connected to the center rod;
a first sleeve sleeved on the center rod, the first sleeve having a protruding rib formed in an inner peripheral thereof, the protruding rib movably disposed between the two stop rings;
two springs sleeved on the center rod, each spring having one end abutted against one of the two stop rings and the other end abutted against the protruding rib; wherein when pulling the first sleeve, the protruding rib biases one of the two springs; when pushing the first sleeve, the protruding rib biases the other one spring to provide a restore force;
a second sleeve sleeved on the center rod and the first sleeve, the second sleeve moved with the first sleeve, the second sleeve having a recess, a first pushing portion, and a second pushing portion respectively formed in an inner peripheral thereof, the recess disposed between the first pushing portion and the second pushing portion; and
an engaging member disposed in an outer peripheral of the center rod, the engaging member having a protruding portion formed therein and an engaging end disposed in one end thereof, wherein when the protruding portion is pushed, the engaging end protrudes into an inner peripheral of the center rod to selectively engage with the tool bit;
wherein when the first pushing portion abuts against the protruding portion, user pulls the first sleeve to move the second sleeve toward the first sleeve such that the protruding portion is received in the recess to disengage the engaging end with the tool bit; when the second pushing portion abuts against the protruding portion, user pushes the first sleeve to move the second sleeve away from the first sleeve such that the protruding portion is received in the recess to disengage the engaging end with the tool bit.

2. The quick-release mechanism for a hand tool as claimed in claim 1 further comprising a clip ring firmly sleeved on the first sleeve and a thrust ring pressed in the inner peripheral of the second sleeve, the second sleeve having a shoulder formed in the inner peripheral thereof, the clip ring disposed between the thrust ring and the shoulder, wherein when the first sleeve moves, the clip ring abuts against the thrust ring or the shoulder to drive the second sleeve move with the first sleeve.

3. The quick-release mechanism for a hand tool as claimed in claim 2, wherein the second sleeve has a taper portion formed between the thrust ring and the shoulder.

4. The quick-release mechanism for a hand tool as claimed in claim 1 further comprising multiple indexes respectively disposed in the center rod, the first sleeve, and the second sleeve for recognize an operation direction of the first sleeve.

5. The quick-release mechanism for a hand tool as claimed in claim 1, wherein a depth of the recess is deeper than that of the first pushing portion and that of the second pushing portion.

6. The quick-release mechanism for a hand tool as claimed in claim 1 further comprising a connecting rod connected to the center rod for adapting to connect to a hand tool.

7. The quick-release mechanism for a hand tool as claimed in claim 6 further comprising a sliding assembly received in the center rod for elastically eject the tool bit, the sliding assembly comprising a first receiving seat, a second receiving seat partially received in the first receiving seat, a magnet received in the first receiving seat, and a spring partially received in the second receiving seat, the magnet provided for attracting the tool bit, the spring of the sliding assembly having one end abutted against the second receiving seat and the other end abutted against the connecting rod.

8. The quick-release mechanism for a hand tool as claimed in claim 7 further comprising a clip member firmly sleeved in the outer peripheral of the center rod, the clip member having a positioning end protruded in the inner peripheral of the center rod, the first receiving seat and the second receiving seat respectively having a flange formed therein, the positioning end disposed between the flange of the first receiving seat and the flange of the second receiving seat for preventing the sliding assembly from falling out.

* * * * *